Feb. 27, 1968  R. H. DAY  3,370,784
INFLATION ASPIRATOR
Filed Feb. 14, 1966
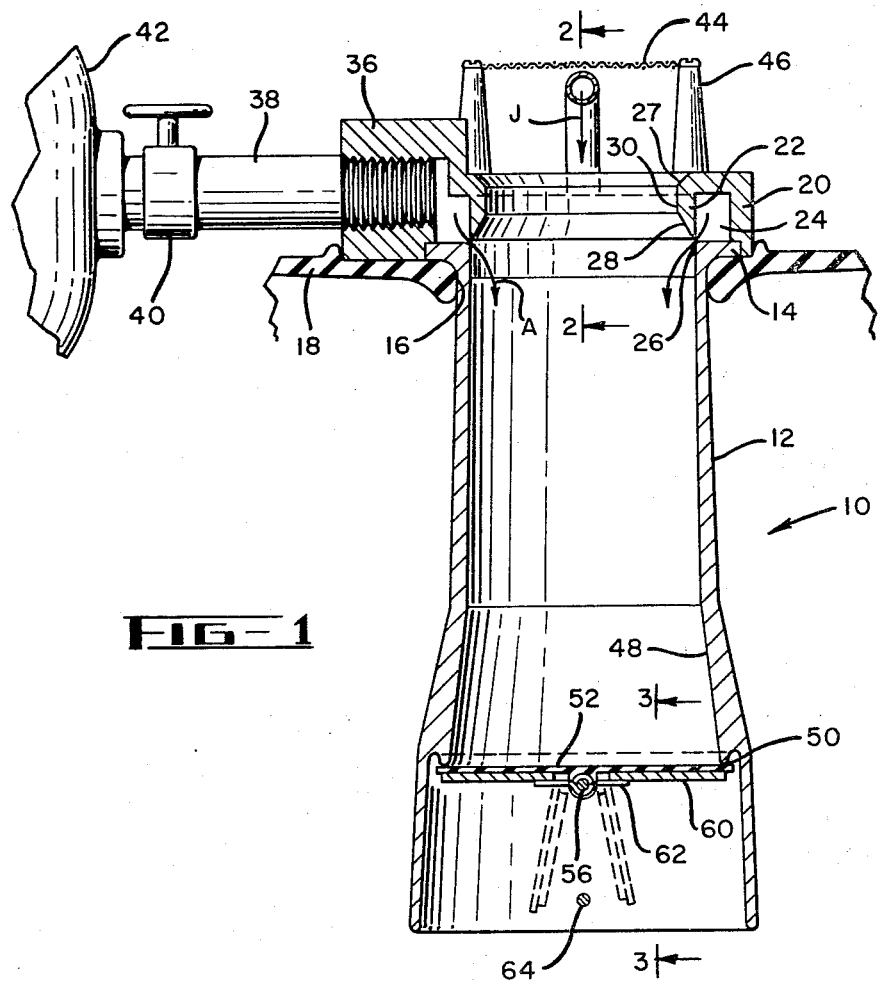
FIG-1
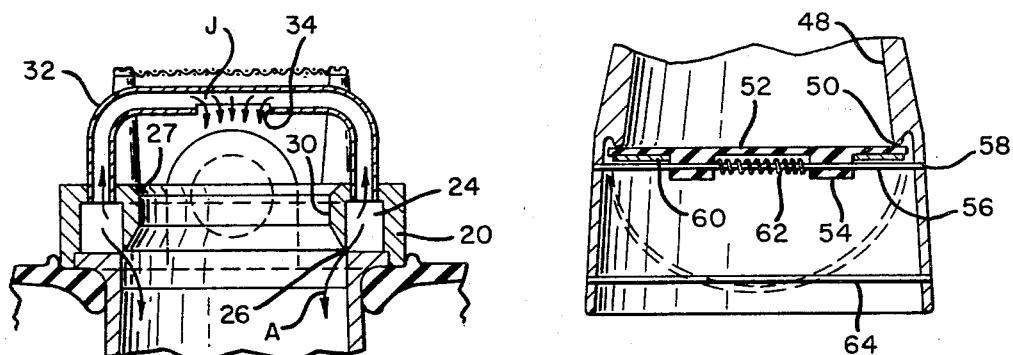
FIG-2
FIG-3
INVENTOR.
RONALD H. DAY
Gregg & Stidham
BY ATTORNEYS

United States Patent Office 3,370,784
Patented Feb. 27, 1968

3,370,784
INFLATION ASPIRATOR
Ronald H. Day, Mill Valley, Calif., assignor to Industrial Covers, Inc., San Francisco, Calif., a corporation of California
Filed Feb. 14, 1966, Ser. No. 527,177
8 Claims. (Cl. 230—95)

This invention relates to an inflation aspirator and, more particularly, to a device for inflating collapsible containers such as aircraft escape chutes, life rafts and inflatable structures.

Particularly in the case of emergency or life saving articles such as the escape chutes and life rafts mentioned, it is generally required that they be stowed in a light, compact package, but at the same time they must be capable of inflation at an extremely rapid rate so that escape may be hastened in order to lessen the degree of peril to life or property. In addition, it is highly desirable to provide as a safety feature means for preventing the article from becoming inflated inadvertently while stowed in a small confinement because considerable damage could be caused to confining structure if the article is inadvertently inflated at high pressure while so stowed.

It is, therefore, an object of this invention to provide a device for inflating collapsible articles.

It is a further object of this invention to provide a simple, compact device for rapidly inflating a collapsible article from a compact package.

It is a further object of this invention to provide an inflating device which, if triggered inadvertently while the inflatable article is stowed, will simply exhaust pressure fluid into the atmosphere.

In carrying out this invention, I provide an aspirator having a tubular housing which is adapted to be mounted on an inflatable article by extending it through an opening in the article and sealing the article around the upstream end of the tubular housing. A fluid conduit extends around the upstream end of the housing and an annular axially directed port or slot opens from the fluid conduit into the housing whereby pressure fluid within the conduit is jetted toward the downstream end of the housing in a hollow cylindrical stream diverging from the inner surface of the housing. Extending across the upstream end of the housing is a U-shaped duct with the legs thereof extending down and mounted on the end of the housing so that the duct opens into the annular fluid conduit. A linear port or slot is cut into the U-shaped duct so that when pressure fluid is introduced into the annular conduit the cylindrical jet sheet is augmented by a jet sheet extending diametrically across the tubular housing and diverging outward to cover the cross-section of the tubular housing. Toward the downstream end of the housing the inner surface is preferably flared outward to a larger diameter and blends into a radially inward projecting lip which forms a valve seat directed toward the downstream end of the housing.

In cooperation with the valve seat is a check valve or flapper which preferably takes the form of a circular disc of rubber or other resilient material which is mounted on a pin extending diametrically across the downstream side of the disc and secured at opposite ends to tubular housing walls. Thus, the pressure of the jet stream impinging upon the disc deflects it downward on both sides of the hinge pin to permit flow into the container until the high pressure fluid is substantially exhausted. The natural flexural strength of the resilient disc would tend to force it back up into sealing position when there is no substantial pressure drop across the valve seat, but such flexural strength is preferably augmented by a spring member which acts against substantially rigid stiffening sheets secured to the back of the resilient valve disc.

Other objects and advantages of this invention will become apparent from the description following when read in conjunction with the accompanying drawings wherein:

FIG. 1 is a vertical section view of an aspirator embodying features of this invention;

FIG. 2 is a partial section view taken along line 2—2 of FIG. 1; and

FIG. 3 is a partial section view taken along line 3—3 of FIG. 1.

Referring now more particularly to FIG. 1, the aspirator 10 of this invention comprises a generally tubular housing 12 with a radial flange 14 at the intake or upstream end thereof. The housing 12 extends through an opening 16 in an inflatable container 18 such as an aircraft escape chute, a life raft or the like, and is sealed around the opening as by means of a suitable bonding material.

Bonded or otherwise to the radial flange is an annular fluid conduit 20 which, as shown, is of generally inverted U-shape in cross-section, with an inner wall 22 extending downward in close proximity to the upper corner of the tubular body 12, thereby forming an annular duct 24 with a downwardly opening annular slot or nozzle 26 through which a cylinderical jet stream may project as indicated by the arrows A. The inner depending wall 22 of the annular duct 24 is chamfered at 27 and 28 to form a throat 30 which creates a low pressure area at the upstream opening of the housing 12 when fluid flows through it. As best seen in FIG. 2, an inverted U-shaped duct 32 is mounted on the annular conduit member 20 to open into the annular duct 24 so that pressure fluid introduced into the duct will also flow into the diametrically disposed U-duct and then out through a linear slot 34 to project through the venturi throat in a flat, diametrical sheet. A suitable boss 36, cast integrally with the annular conduit member 20, is bored and tapped to receive a high pressure line 38 with a valve 40 connecting it to a suitable source of pressure, such as a tank or bottle 42 filled with a suitable compressed gas.

Thus, when the valve is opened, pressure fluid rushes into the annular duct to flow out through the annular nozzle 26 and up through the U-shaped tube to project in a diametrical jet sheet as indicated by the arrows J. The two jets A and J naturally radiate outward to cover together virtually the entire cross-section of the tubular housing 12 and drive molecules through it. Ambient air is drawn in through the throat 30 to fill the resultant void, and this action is augmented by the creation of a low pressure zone at the venturi throat, greatly to increase the volume of gas flowing through the tubular housing and into the inflatable member 18. Preferably, a screen 44 is mounted on support posts 46 carried on the annular conduit member 20 to restrict entry of foreign matter.

Toward the downstream end of the housing the inner surface is flared outwardly at 48 into generally frustroconical configuration blending smoother into a downwardly extending lip 50 which functions as a valve seat that operates in a manner now to be described. In cooperation with the valve seat 50 is a resilient flapper disc 52 of rubber or the like which is preferably molded with one or more depending female hinge members 54 to receive a hinge pin 56 that is secured diametrically across the flapper disc and to opposite sides of the housing by projecting into accommodating holes 58. While the pin 56 has been described as a hinge pin and the depending female ears as hinge elements, these terms are to be construed in their broadest sense, inasmuch as it is apparent that with a flexible disc pivotal movement is not required since the valve is opened by flexing or deforming the disc to the position shown in phantom in FIG. 1. Secured to the downstream side of the disc are stiffener members 60 of metal or the like which may be formed as segments of a circle disposed concentrically with the edge of the flapper disc 52. Acting against such stiffener members are the opposite ends of a torsion spring 62 which augment the natural flexural strength of the resilient flapper valve disc, normally to urge the flapper valve into the sealed position of FIGS. 1 and 3.

By flaring the tubular housing outward toward the check valve flapper disc, the flow capacity of the tubular housing is maintained, even though the opening is partially blocked by the central strip of the flexible flapper valve when it is deformed in the position shown in FIG. 1. It is highly desirable to restrict the diameter of the tubular housing 12 so that the jets A and J cover the full cross-section, but at the same time it is desirable that flow capacity be maintained for maximum intake of ambient air. Thus, though a portion of the opening is blocked by the hinge pin 56 and portions of the flexible flapper disc bent around it, flow capacity is maintained by reason of the outward flaring.

Disposed below the hinge pin is a second pin 64 secured in openings at the downstream end of the housing, and this pin serves as a stop member to limit downward flexible deformation of the resilient valve disc. It will be noted that neither the hinge pin 56 nor the stop pin 64 need be sealed against leakage with the housing since they are both on the downstream side of the valve seat.

In the operation of this device, the pressure bottle valve 40 is opened and a stream of high pressure fluid is introduced into the annular conduit. This causes the pressure fluid to be projected into the tubular housing in a cylindrical jet sheet A through the annular port 26 and in a diametrical sheet J from the slot 34 in the tube 32 so that virtually the entire cross-section of the tubular housing is influenced by high speed fluid jets which induce flow of ambient air through the upstream end of the housing to replace molecules previously induced. The high pressure flow impinges upon the resilient flapper disc, deflecting it downward away from the valve seat to the position shown in phantom in FIGS. 1 and 3, in which it remains until pressure differential across the valve seat is reduced to a level at which it is overcome by the light spring whereby the valve seat is urged into the sealing position shown in FIG. 1. The pressure in the tube 12 is thereafter dissipated to the atmosphere so that the spring force is augmented by the pressure within the vessel 18.

When the tubular housing 12 and inflatable vessel are stowed in close confinement before inflation, expansion of the flexible material of the vessel 18 is resisted, and though the flapper valve 52 is initially deflected, a back pressure quickly builds up to close the valve and prevent further entry of fluid flow. Since the jets are released on the upstream side of the valve, entrapment of the full gas charge is prevented and the initial high pressure closes the valve so that the gas merely flows down to the flapper and then back up to the tubular housing inlet.

The description of this device with reference to the upstream and downstream ends of the tubular body is, of course, based on the direction of flowing fluid. It is obvious that after inflation, with the flapper valve 52 closed, the interior of the container becomes the "upstream" side of the valve.

While this invention has been described in connection with a preferred embodiment thereof, it will be apparent to those skilled in the art that modifications and changes therein may be made without departing from the spirit and scope of the invention as defined by the claims appended thereto.

Having described my invention, I claim:

1. A device for inflating a container comprising:
a tubular body,
a valve seat around the inner wall of said tubular body,
a check valve member,
yieldable means biasing said valve member into engagement with said valve seat,
a fluid conduit surrounding the inner surface of said body on the upstream side of said valve member,
means forming an annular jet nozzle in said conduit coaxial with said body and opening therein, directed toward the downstream end thereof,
a duct across the upstream end of said body,
a slot in said duct facing said upstream end of the body, and
means for conducting pressure fluid to said fluid conduit and said duct.

2. The inflating device defined by claim 1 wherein said duct comprises a tube connected at opposite ends to said fluid conduit.

3. The inflating device defined by claim 1 wherein:
said duct comprises a generally U-shaped tube with the opposite legs thereof directed axially to open into said fluid conduit on the upstream side of said annular port.

4. The inflating device defined by claim 1 wherein said check valve comprises:
a disc of flexible material, and
a hinge pin secured diametrically across the downstream side of said disc, the opposite ends of said pin being secured to opposite walls of said body.

5. The inflating device defined by claim 4 including:
a pair of substantially rigid stiffener sheet members secured to the downstream side of said disc on opposite sides of said hinge pin.

6. The inflating device defined by claim 4 wherein:
the inner surface of said tubular body flares outward toward said valve seat from the upstream side thereof so that the flow capacity of said body is not materially reduced by said valve seat and said valve when in open position.

7. The inflating device defined by claim 4 including:
stop means in said tubular body below said hinge pin to limit downstream flexing of said flexible disc.

8. The inflating device defined by claim 5 including:
yieldable means biasing portions of said disc on opposite sides of said hinge pin into firm sealing engagement with said valve seat.

References Cited

UNITED STATES PATENTS

| | | | |
|---|---|---|---|
| 2,361,861 | 10/1944 | Masowich | 230—95 |
| 2,772,829 | 12/1956 | Crawford et al. | 141—286 X |
| 3,204,862 | 9/1965 | Hadeler | 230—95 |

LAVERNE D. GEIGER, *Primary Examiner.*

HOUSTON BELL, *Assistant Examiner.*